(12) United States Patent
Azenkot et al.

(10) Patent No.: US 6,859,488 B2
(45) Date of Patent: Feb. 22, 2005

(54) DETECTION OF IMPULSE NOISE USING UNUSED CODES IN CDMA SYSTEMS

(75) Inventors: Yehuda Azenkot, San Jose, CA (US); Zhenzhong Gu, Sunnyvale, CA (US); Selim Shlomo Rakib, Cupertino, CA (US)

(73) Assignee: Terayon Communication Systems, Inc.

( * ) Notice: Subject to any disclaimer, the term of this patent is extended or adjusted under 35 U.S.C. 154(b) by 0 days.

(21) Appl. No.: 10/255,286

(22) Filed: Sep. 25, 2002

(65) Prior Publication Data

US 2004/0057502 A1 Mar. 25, 2004

(51) Int. Cl.$^7$ .............................. H04B 1/69; H04B 1/10; G10L 19/12
(52) U.S. Cl. .................... 375/147; 375/254; 704/222
(58) Field of Search .................. 375/254, 147; 370/342; 704/222, 233

(56) References Cited

U.S. PATENT DOCUMENTS

| | | | | |
|---|---|---|---|---|
| 5,619,167 A | * | 4/1997 | Adachi | 329/304 |
| 5,703,904 A | * | 12/1997 | Langberg | 375/232 |
| 6,604,070 B1 | * | 8/2003 | Gao et al. | 704/222 |
| 6,647,070 B1 | * | 11/2003 | Shalvi et al. | 375/285 |
| 6,671,667 B1 | * | 12/2003 | Chandran et al. | 704/233 |
| 2003/0043925 A1 | * | 3/2003 | Stopler et al. | 375/254 |
| 2003/0099287 A1 | * | 5/2003 | Arambepola | 375/227 |

\* cited by examiner

*Primary Examiner*—Stephen Chin
*Assistant Examiner*—Cicely Ware
(74) *Attorney, Agent, or Firm*—Ronald Craig Fish A Law Corp.; Ron Fish (57) ABSTRACT

An impulse detector which can detect both low and high levels of impulse noise in a CDMA system is comprised of circuitry to calculate the background noise level in unused codes. Another circuit calculates the average noise power in the unused codes of each spreading interval to output the noise power per spreading interval. This average is continuously averaged over spreading intervals by another circuit which outputs the average background noise power. A comparator compares the noise power in the current spreading interval with the background noise power plus a programmable threshold and generates an erasure indication if the background noise power plus a discrimination threshold is exceeded.

15 Claims, 7 Drawing Sheets

IMD BY UNUSED CODES DETECTOR

$$[S_1, S_2 \cdots S_{128}]_{16} \times \begin{bmatrix} C_{1,1} & C_{1,2} & \cdots & C_{1,128} \\ C_{2,1} & C_{2,2} & \cdots & C_{2,128} \\ \vdots & & & \\ C_{128,1} & C_{128,2} & \cdots & C_{128,128} \end{bmatrix}_{18} = [R_1 \cdots R_{128}]_{20}$$

ROW NUMBER
COLUMN NUMBER

FIG. 3

$$R_1 = S_1 \cdot C_{1,1} + S_2 \cdot C_{2,1} \cdots + S_{128} \cdot C_{128,1}$$

FIG. 4

$$R_i = \sum_{m=1}^{128} S_m \cdot C_{m,i}$$

FIG. 5

$$\begin{bmatrix} R_1 & \cdots & R_{128} \end{bmatrix} \cdot \begin{bmatrix} C_{1,1} & C_{2,1} & \cdots \\ C_{1,2} & & \\ \vdots & & \\ C_{1,128} & \cdots & \end{bmatrix} = \underline{Y}$$

COLUMN NUMBER
ROW NUMBER
$C^T$ — 24
— 20
= $\underline{Y}$
↑ 26
TRANSPOSE MATRIX

FIG. 6

$$\underline{Y} = \begin{bmatrix} Y_1, Y_2 & \cdots & Y_{128} \end{bmatrix}$$

WHERE $$Y_j = \sum_{i=1}^{128} R_i \cdot C_{j,i}$$

FIG. 7

$$Y_j = \sum_{i=1}^{128} \left[ \sum_{m=1}^{128} S_m \cdot C_{m,i} \right] \cdot C_{j,i}$$

FIG. 8

$$Y_j = \sum_{i=1}^{128} \sum_{m=1}^{128} S_m \cdot C_{m,i} \cdot C_{j,i}$$

$$OUT_K = (1-\mu)OUT_{K-1} + \mu N_K$$

WHERE $OUT_K$ = OUTPUT NOISE POWER MOVING AVERAGE ON LINE 62

$\mu$ = A SMALL CONSTANT SUCH AS $2^{-4}$ $OUT_{K-1}$ = THE AVERAGE NOISE POWER AFTER THE PREVIOUS SPREADING INTERVAL $N_K$ = THE NORMALIZED POWER PER UNUSED CODE IN SPREADING INTERVAL K

DETECTION OF IMPULSE NOISE USING UNUSED CODES IN CDMA SYSTEMS

BACKGROUND OF THE INVENTION

In cable modem and cellular systems and other wireless technologies where digital data is transmitted from one place to another using modulated radio frequency carriers there is always a problem of impulse noise corrupting the transmissions and causing errors. Impulse noise can be caused by many sources.

Digital data transmissions typically involve, a stream of data bits which are broken down into code words such as Reed-Solomon blocks for encoding with error detection and correction bits (hereafter EOC bits).

Impulse noise detection in the time domain is known and is in commercial use in the Cable Modem Termination System (hereafter CMTS) receivers code named Jasper I supplied by the assignee of the present invention. The time domain impulse detection technique used a window that was several samples wide and detected the power received during that window and compared it to a threshold. The CMTS circuitry controls the transmitted power of each burst by downstream messages, so it knows what power to expect. The threshold was set high enough so that data transmissions not corrupted by impulse noise would not have sufficient power to exceed the threshold. If the threshold was exceeded during the window, it was assumed that impulse noise had an additive effect on the payload data to corrupt it and exceed the noise threshold. This time domain system can discover high power impulse noise and take steps to minimize its effect by setting an erasure bit on any symbol in the window that may be corrupted by noise.

However, with lower power impulse noise, the detection problem becomes much more difficult because it is much more difficult to distinguish between what is noise and what is real signal, and to eliminate only the noise. This is because the use of a power threshold is limited, and when it is lowered enough to detect low power noise, the power of uncorrupted payload data may also exceed the threshold and cause false erasure indications of symbols that are not corrupted by noise. There is a limit to how close to the expected power the noise power threshold can be set. This allows some symbols corrupted by low power noise to get through the system and can lead to errors in recovering the payload data and throw the CMTS tracking loops off synchronization.

Therefore, a need has arisen for a way of detecting low power or high power impulse noise without giving erasure indications on symbols that are not corrupted by noise.

SUMMARY OF THE INVENTION

A system according to the genus of the invention will detect low power or high power impulse noise in code division multiplexed or synchronous code division multiplexed (hereafter COMA and SCDMA, respectively) transmissions by calculating background noise level in unused codes and then detecting power on unused codes during bursts and comparing the detected power to the background noise level. If the detected power exceeds the background noise level by a threshold, preferably programmable, then impulse noise is present since there is not supposed to be any signal power above the background noise level in unused codes. Unused codes means either codes which are unassigned during particular frames or spreading intervals or codes which the CMTS has designated as inactive. Typically, in older, more noisy cable plants, the CMTS will reserve as inactive codes a number of codes which are high enough to insure that the power per code is high enough for the receivers in the system to adequately receive data on the active codes. Unassigned codes are codes which are not assigned to any cable modem for a particular spreading interval and frame because of light traffic load. In a noisy system, where noise detection and management requires the use of the impulse detection technology of the invention, there will virtually always be either inactive codes or unassigned codes which can be used to practive the invention.

Any power detected on unused codes is noise and indicates that the transmission of payload data may be corrupted. Any system that can detect power on unused codes to determine the presence of noise and which takes steps to eliminate the noise from the final output of recovered data will suffice to practice the invention. In the preferred embodiment, when noise is found, the received symbols that may be corrupted with noise are marked with an erasure bit so that they can be ignored in the data recovery process and are not used in the various tracking loops of the CMTS receiver to track the symbol clock, etc. and are also used for improving the error correction capability of the error correction codes such as Reed Solomon and trellis codes.

The advantage of the unused code technology over the prior art time domain technology is that in the prior art time domain technology, a power threshold was used to detect when noise power was mixed with the desired signal power which increased the total received power by an additive effect detected by the threshold. Because there was no separation between the noise power and the desired signal power, there was a limit to how close to the expected power, the threshold could be set and this allowed low power impulse noise to sneak through the system. With the unused code technology, there is no expected legitimate signal power on any unused code, so any power detected on an unused code must be noise. Because of this separation between legitimate signal power on assigned codes and unwanted noise power on unassigned codes, it is possible to detect much lower levels of noise power than is possible in the prior art time domain/power threshold technology.

Although the invention is illustrated in terms of a CMTS receiver in a cable modem system, it is applicable to any wired or wireless system where code division multiplexing is in use and wherein there are unused spreading codes during at least some transmissions which can be received and analyzed to determine if there is any power present on the unused codes.

In the preferred embodiment, the older time domain impulse detection is used in conjunction with the newer unused code noise detection circuitry with the option to turn either one or both off or use both.

Basically, only three steps need to be performed to practice the method genus of the invention. First, the background noise power level in the unused codes over enough spreading intervals to be sure it is the true background noise power level needs to be calculated. This background noise power calculation can be done by averaging the noise power levels in the unused codes of a large number of spreading intervals or calculating a moving average thereof, or just making a table or list of the noise power levels over a large sample of unused codes from multiple spreading intervals or multiple frames, and surveying the values and picking a background noise power value which is typical of most of the background noise power levels listed for the unused codes. In alternative embodiments, the background noise level is calculated on codes carrying payload data using slicer errors signals. In other embodiments, the background noise can be calculated using all the assigned codes using slicer errors and all the unused codes as well using the techniques described herein. This gives a more accurate estimate since all the codes are used in the estimate. Typically, the background noise is calculated as an average over the spreading intervals of at least one frame and typically multiple frames. The preferred species within this genus calculates the background noise level in the unused codes as a moving average over as many frames' spreading intervals as have been processed since initialization.

Second, the noise power level in each spreading interval is determined by averaging the noise power of all the unused codes in the spreading interval. This step involves receiving the possibly noise corrupted despread symbols of a spreading interval and determining the noise power level in the unused codes. Typically this is done by averaging the noise power in the received symbols that had zero amplitude or value when transmitted. In quadrature amplitude modulated systems or any system where amplitude and phase are used to define each symbol, the power of a symbol is $I^2+Q^2$ where I and Q are the Cartesian coordinates of the received symbol in the constellation. In other embodiments, the noise power in each symbol that is supposed to be zero (an "unused code") is listed in a table, and the noise power for the spreading interval is determined by picking a characteristic value, or averaging over all the unused codes in the spreading interval. This is not the most accurate method since the impulse noise may last less than the entire spreading interval, but since the impulse noise is spread out into all the received symbols in the despreading process, this embodiment also works.

Step 2 is where the rubber meets the road since if the noise power in the "unused codes" of a spreading interval is higher by some threshold amount than the background noise, then impulse noise has corrupted the symbols transmitted during that spreading interval. Because the standard against which the noise power in the unused codes of a spreading interval is measured is the background noise in the unused codes over many spreading intervals, much finer discriminations are possible than were possible in the prior art time domain impulse noise detectors. This is possible because there is no actual payload signal in the unused codes which has to be respected during the discrimination process, so any power that is present is noise power.

Third, the noise power level in each spreading interval is compared to the background noise level as determined from the unused codes in a plurality of spreading intervals and, preferably, a plurality of frames. In the preferred class of species, the background noise power plus some discrimination threshold is used as the standard against which the noise power in a spreading interval is measured. Preferably, the discrimination threshold is programmable, and is set high enough that erasure indications will not be generated if the noise corrupted symbols still have a signal-to-noise ratio which is high enough that they can be successfully received given the error correction and other capabilities of the receiver's slicer and tracking loop circuitry.

DETAILED DESCRIPTION OF THE PREFERRED AND ALTERNATIVE EMBODIMENTS

In a CMTS receiver of a cable system where cable modems (CMs) are transmitting upstream bursts using SCDMA technology there are spreading intervals. For purposes of illustration, assume there are 128 different spreading codes which may or may not be cyclic. During each spreading interval, some or all of these codes will be assigned to one or more CMs to transmit bursts. Each CM will use different spreading codes so that their transmissions can be separated by the CMTS in case two or more bursts are transmitted simultaneously by different CMs. To understand the notion of spreading intervals, SCDMA frames and unused codes, refer to FIG. 2.

Figure 2:
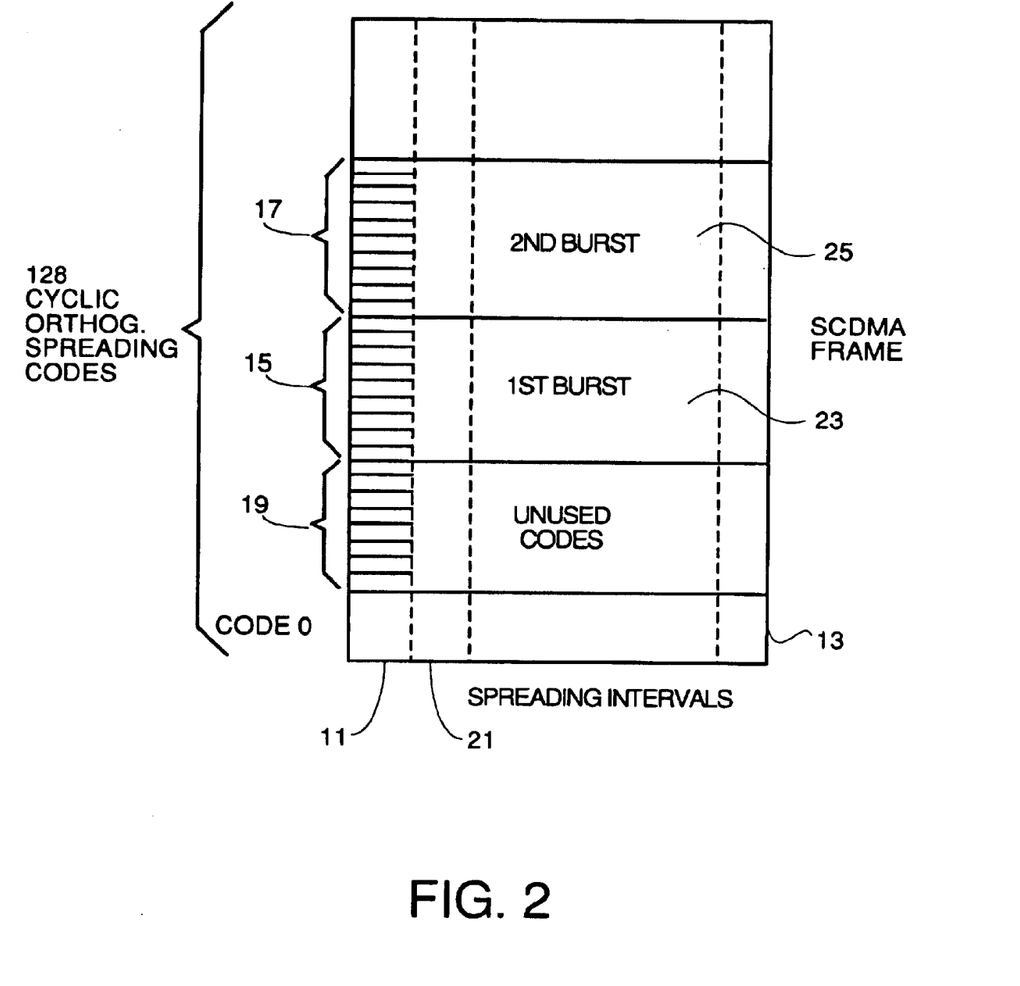
FIG. 2 is a diagram of an SCDMA frame which is useful for explaining the structure of a typical SCDMA frame with multiple bursts and showing unused codes.

FIG. 2 is a diagram of a single SCDMA frame which is useful for explaining the structure of a typical SCDMA frame with multiple bursts and showing unused codes. The invention is equally applicable to any code division multiplexed digital data transmission system which has unused spreading codes, but a Synchronous Code Division Multiple Access (SCDMA) system is assumed here. Each frame contains one or more spreading interval. During each spreading interval, a number of symbols equal to the number of spreading codes in a code book are transmitted using spread spectrum multiple access transmission so that multiple bursts from one or more cable modems or other transmitters may be transmitted simultaneously.

Figure 3:
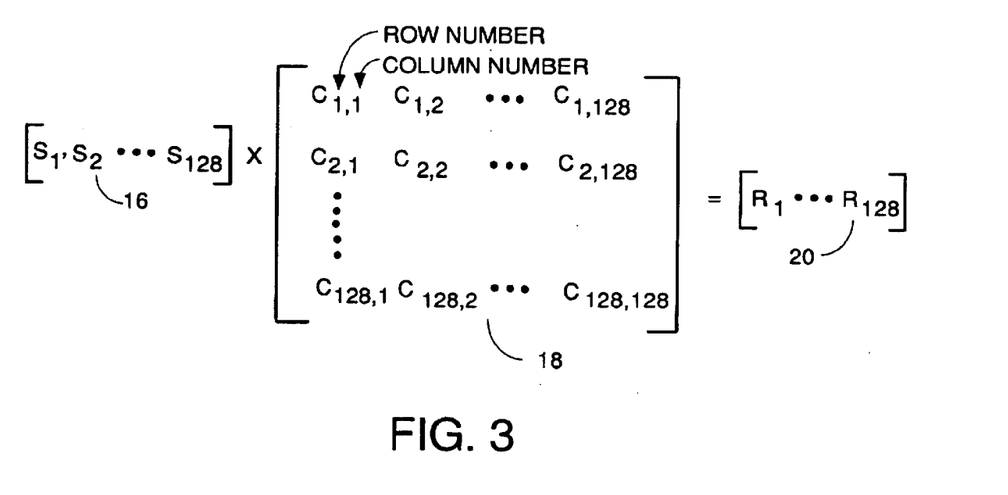
FIG. 3 shows the details of this matrix multiplication at the cable modem of a 1×128 linear information vector $S_k$ times a 128×128 code matrix C to yield a 1×128 chip result vector $R_k$ to be transmitted during a spreading interval.

Column 11 represents the first spreading interval in the SCDMA frame, and column 21 represents the second spreading interval in the frame. In DOCSIS 2.0 compliant systems, there are a maximum of 32 spreading intervals. The vertical dimension of each spreading interval is divided into 128 rows, each row representing one of the 128 cyclic, orthogonal spreading codes in the code book. Blocks 23 and 25 represents the transmitted symbols in first and second bursts, respectively, transmitted simultaneously from different CMs using different spreading codes during the spreading intervals of the frame shown in FIG. 2. During each spreading interval, 128 possible symbols can be transmitted, and those 128 symbols in the information vector 16 in FIG. 3 are divided among the bursts being transmitted, the null SIDs and unused codes. That is, in column 11, the spectra of the symbols of the first and second burst have their spectrum spread by different sets of spreading codes in a set of 128 cyclic, orthogonal spreading codes. Code 0 is represented by the bottom row 13. The codes used to spread the spectrum of the first burst are represented by the rows within bracket 15, and the codes used to spread the spectrum of the second burst are represented by the rows within bracket 17. The first and second bursts are transmitted simultaneously and are separated out at the CMTS receiver by a despreader in a known manner.

The rows within bracket 19 are unused codes. Every DOCSIS upstream SCDMA frame may have some unused codes in it depending upon the programmable value of the number of active codes (controlled by the CMTS) and depending upon whether a null SID is being used to separate a channel into different logical subchannels.

The spectrum spreading process to send each burst at the CM involves matrix multiplying a linear information vector $S_k$ comprised of 128 symbols times a 128×128 two dimensional code matrix containing the elements of each of the 128 spreading codes. This matrix multiplication results in an output vector comprised of 128 chips, each of which is the sum of the partial products where each partial product is the product of a symbol from the information vector times a corresponding element from a spreading code.

All the symbols of the information vector can come from a single cable modem's burst, or the symbols may come from several different cable modems where each cable modem puts symbols into its information vector at positions corresponding only to its assigned codes received in a bandwidth assignment downstream message from the CMTS and puts zeros at all other locations. Then, by superposition, the result vectors of all the cable modems with assigned bandwidth add together on the hybrid fiber coax (HFC) for transmission to the CMTS.

In each spreading interval, a vector $P_k$ is transmitted which is the result vector comprised of 128 chips. These 128 chips were generated from the symbols of one or more information vectors generated by the cable modems which have been assigned bandwidth for the spreading interval. If more than one cable modem is assigned bandwidth, more than one information vector will be generated, but the total number of symbols in all the information vectors generated by the CMs with assigned bandwidth does not exceed 128.

There will be one result vector generated at each CM with assigned bandwidth, but if all the result vectors were added together, the result would be one result vector with 128 chips as if one information vector with 128 symbols were matrix multiplied times the code matrix.

Figure 4:
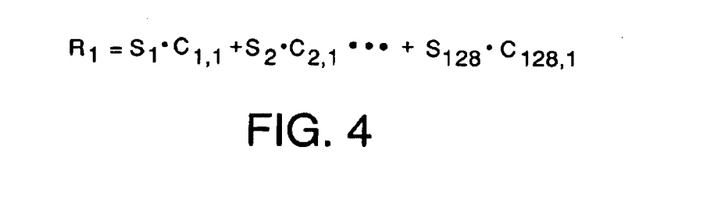
FIG. 4 is the mathematical equation detailing the partial products which are summed from the matrix multiplication of FIG. 3 to yield the first chip, $R_1$ of the result vector.
Figure 5:
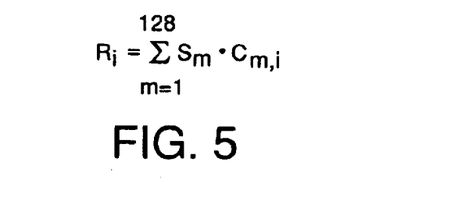
FIG. 5 is the general mathematical expression that defines the value for any $R_i$ element of the result vector $R_k$ and is the mathematical expression that defines how matrix multiplication of a linear vector times a two dimensional vector is carried out.

Each vector $R_k$ is the result of the matrix multiplication of an information vector, called $S_k$ in the DOCSIS 2.0 specification, times the code matrix C. The details of how this calculation is performed are taught in the DOCSIS 2.0 specification at Section 6.2.14, which is hereby incorporated by reference as is the rest of the DOCSIS 2.0 specification (where $R_k$ is equivalent to $P_K$ in the DOCSIS specification. FIG. 3 shows the details of this matrix multiplication at the cable modem of a 1×128 linear information vector $S_k$ shown at 16 times a 128×128 code matrix C shown at 18 to yield a 1×128 chip result vector $R_k$ shown at 20 to be transmitted during a spreading interval. FIG. 4 is the mathematical equation detailing the partial products which are summed from the matrix multiplication of FIG. 3 to yield the first chip, $R_1$ of the result vector. FIG. 4 shows that the first element $R_1$ of the result vector $R_k$ is the sum of the partial products of the symbols $S_m$ of the information vector $S_k$ times the corresponding code elements (having a row index equal to m) in the first column (having column index 1) of the code matrix C. FIG. 5 is the general mathematical expression that defines the value for any $R_i$ element of the result vector $R_k$ and is the mathematical expression that defines how matrix multiplication of a linear vector times a two dimensional vector is carried out.

Figure 6:
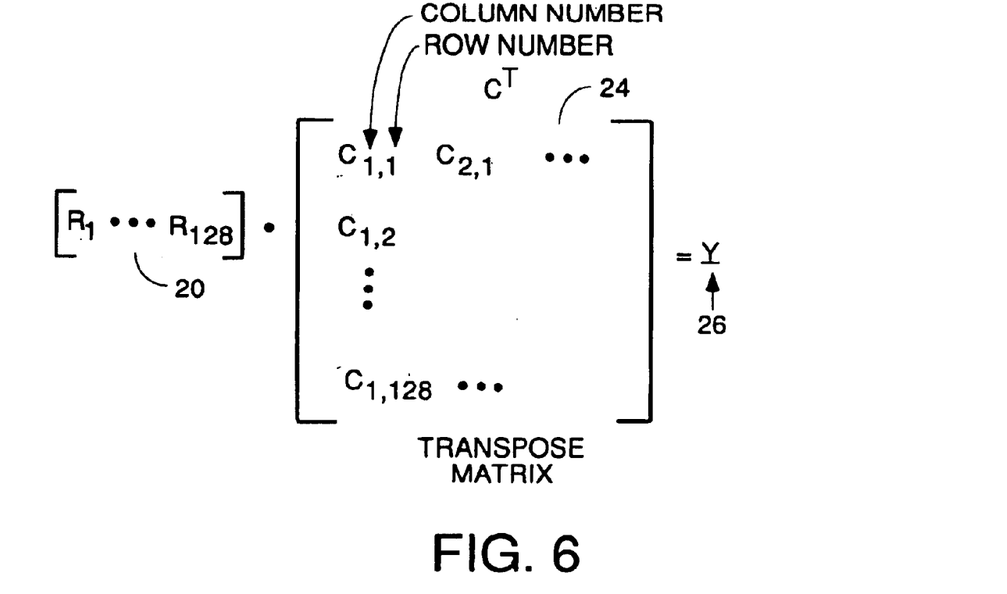
FIG. 6, the result vector $R_k$ shown at 20 is matrix multiplied times the transpose of the code matrix C which is labelled $C^T$ and shown at 24.
Figure 7:
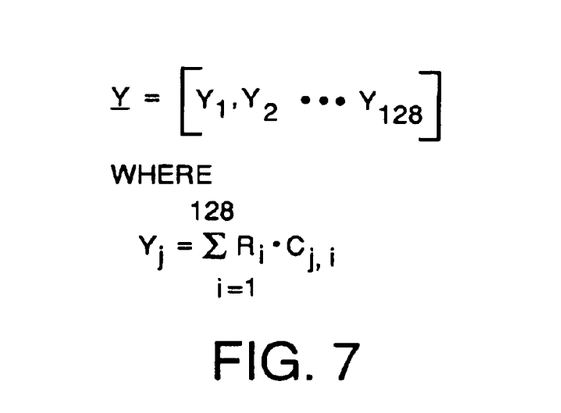
FIG. 7 is the mathematical expression which defines the value of any element $Y_i$ of the received symbols vector $\underline{Y}$ and shows that each $Y_i$ is the sum of the partial products of the individual chips of the result vector times the corresponding elements of the corresponding row of the transpose matrix $C^T$.

At the CMTS, as symbolized by FIG. 6, the result vector $R_k$ shown at 20 is matrix multiplied times the transpose of the code matrix C which is labelled $C^T$ and shown at 24. Note that the row and column indices are reversed in the transpose matrix. This matrix multiplication recovers a received symbols vector $\underline{Y}$ of 1×128 symbols shown at 26. These symbols may be corrupted with AWG and impulse noise. The transpose matrix $C^T$ is simply the code matrix C shown at 18 in FIG. 3 with its rows set as the columns of the transpose matrix. FIG. 7 is the mathematical expression which defines the value of any element $Y_i$ of the received symbols vector $\underline{Y}$ and shows that each $Y_i$ is the sum of the partial products of the individual chips of the result vector times the corresponding elements of the corresponding row of the transpose matrix $C^T$. Thus, $Y_1 = R_1 * C_{1,1} + R_2 * C_{1,2} \ldots R_{128} * C_{1,128}$.

Since the code matrix rows and columns are symmetrical, a row of the transpose matrix is identical to a corresponding column of the code matrix.

Figure 8:
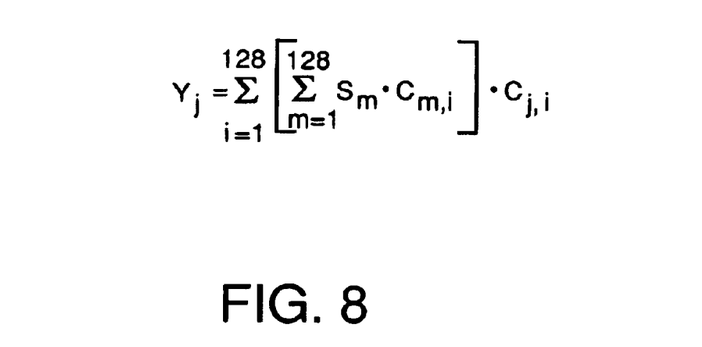
FIG. 8 is the mathematical expression that results from substituting the expression of FIG. 5 for $R_i$ for $R_i$ in the summation of FIG. 7.

Substituting the expression of FIG. 5 for $R_i$ for $R_i$ in the summation of FIG. 7 yields the equation of FIG. 8. Simplifying the expression of FIG. 8 yields the expression of FIG. 9. Because the code elements $C_{m,i}$ and $C_{j,i}$ only have two values, 1 and 0-1, the expression of FIG. 9 will be a non zero value only when j=i where i is the column index of the code elements of the code matrix C and j is the row index of the transpose matrix CT.

Figures 9, 10:
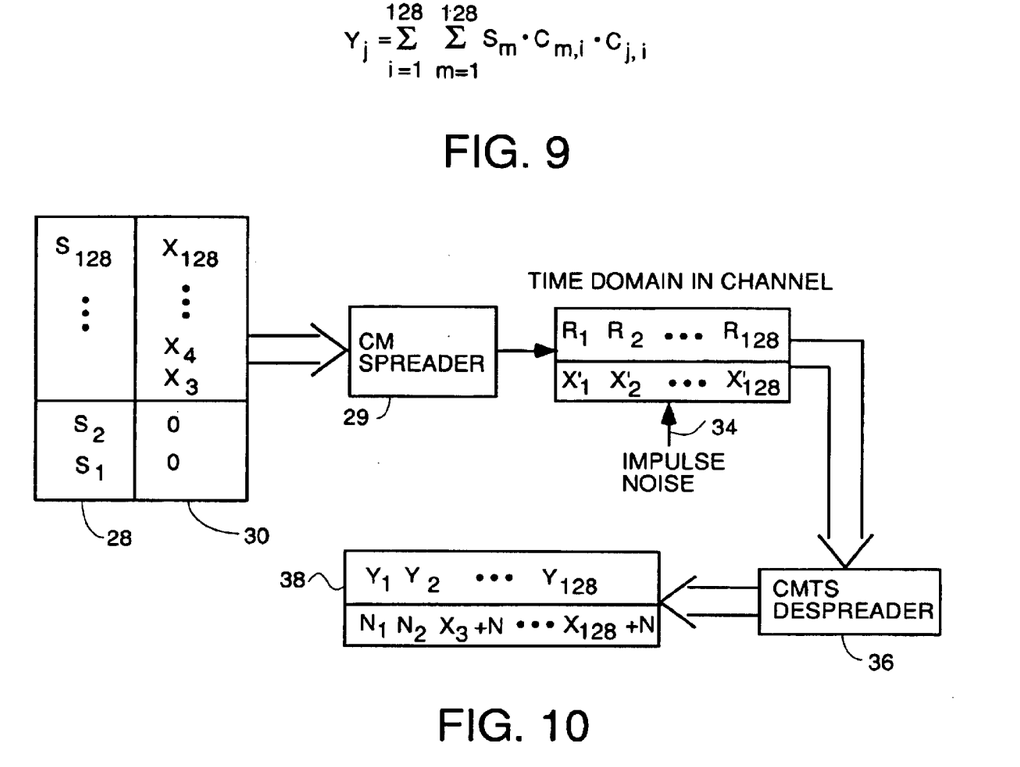
FIG. 9 is the simplification of FIG. 8.
FIG. 10 is a diagram of the process of transmitting one information vector of symbols during one spreading interval showing how impulse noise in the time domain in the channel affects the transmitted chips and the received symbols.

FIG. 10 is a diagram of the process of transmitting one information vector of symbols during one spreading interval showing how impulse noise in the time domain in the channel affects the transmitted chips and the received symbols. The transmitted information vector is shown at 28 and has 128 symbols. The values for those symbols are shown at 30. In this example, the values of $S_1$ and $S_2$ are set to zero because the spreading codes used to spread these symbols are to remain unassigned during the spreading interval. The values for symbols $S_3$ through $S_{128}$ are the values $X_3$ through $X_{128}$. The spreading of the spectrum of information vector 30 by matrix multiplier 29 results in a result vector of 128 chips $R_1$ through $R_{128}$ which have values $X_1'$ through $X_{128}'$, shown at 32. Even though $S_1$ and $S_2$ have zero values, $X_1'$ and $X_2'$ do not have zero values because of the way the matrix multiplication works as can be determined from FIG. 5. The time interval it takes to transmit all 128 chips is one spreading interval.

Now suppose impulse noise 34 occurs in the middle of the spreading interval and adds to the values of some of the chips in the middle of the spreading interval. When the result vector 32 is received and has its spectrum despread by the CMTS despreader 36, the extra impulse noise energy of pulse 34 in the time domain gets spread throughout the received symbols vector shown at 38 and adds some energy to each of the received symbols $Y_1$ through $Y_{128}$. This is why spread spectrum technology provides a code gain—noise in the channel has its spectrum spread in the despreader at the same time the spread spectrum of the actual transmitted symbols gets despread while the spread spectrum of the payload data gets despread to reconcentrate the energy of each symbol into that symbol. The despreading of the noise corrupted received chips of the result vector 32 after transmission through the channel results in a linear received noise corrupted symbols vector 38 having 128 received symbols $Y_1$ through $Y_{128}$. Received symbols $Y_1$ and $Y_2$ correspond to transmitted symbols $S_1$ and $S_2$, respectively but, in this example, corrupted by noise. If there had been no impulse noise in the channel, the values $N_1$ and $N_2$ for $Y_1$ and $Y_2$, respectively, would be zero because transmitted symbols $S_1$ and $S_2$ had zero values. But because the impulse noise gets spread by the despreader 36 into all the received symbols $Y_1$ through $Y_{128}$, the values for $N_1$ and $N_2$ are not zero. Further, the value for $Y_3$, which is supposed to correspond to the value $X_3$ for $S_3$, is actually $X_3$ plus some noise factor N attributable to the spreading of the spectrum of the impulse noise 34.

Because the values for $N_1$ and $N_2$ are not zero but are supposed to be zero, low level impulse noise can be detected by the CMTS by examining the values of the received symbols that correspond to zero value transmitted symbols. Because the CMTS assigned the spreading codes for this spreading interval, the CMTS knows that the values for $Y_1$ and $Y_2$ should be zero because the codes to spread them were unassigned. Because the values for $Y_1$ and $Y_2$, i.e., $N_1$ and $N_2$, are not zero, the CMTS knows that impulse noise occurred in the channel during this spreading interval and can mark all the symbols received during this spreading interval with an erasure indication which can be used by the CM receiver to advantage. Typically, the symbols are marked with an erasure indication by setting an erasure bit in the digital representation of each symbol from this spreading interval to logic 1.

Symbols that are marked with erasure bits are not thrown away, but the erasure bit causes the error correction and detection process to examine these symbols more closely to make sure they are not decoded into the wrong bits. Symbols marked with erasure bits are also not used by the tracking loops in the CM receiver to synchronize to the symbol clock, etc. The process to use the erasure bits in the error correction circuitry is well known as is the circuitry to use the erasure bits of symbols to ignore them in the tracking loops in the CMTS receiver.

Figure 1A:
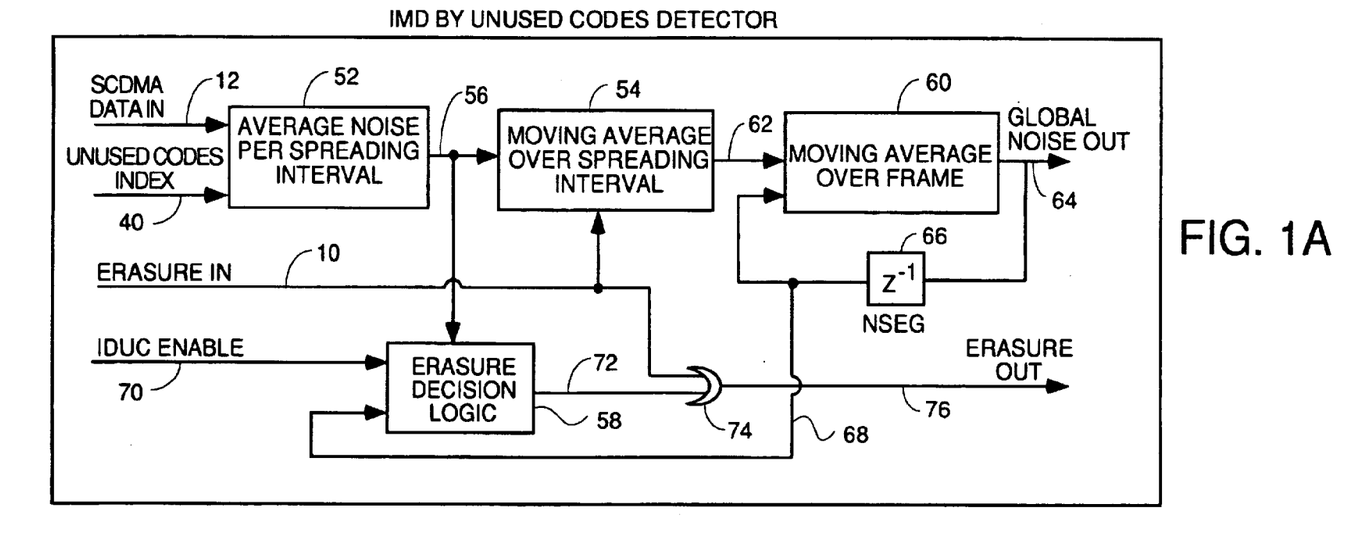
FIG. 1A is a block diagram of one alternative embodiment of the unused code impulse detection circuitry of the invention.
Figure 1B:
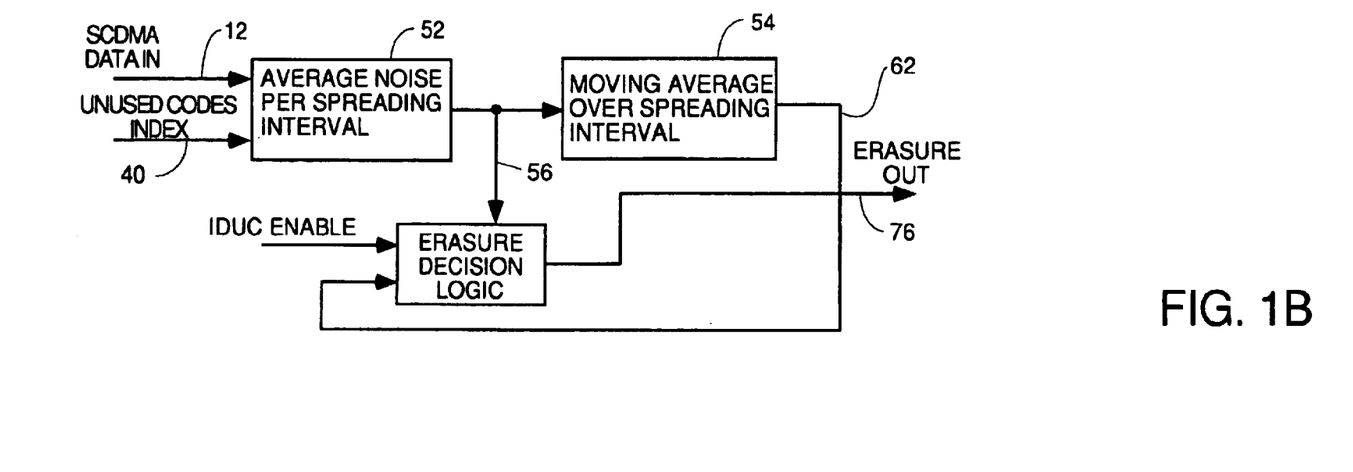
FIG. 1B is a block diagram of the preferred embodiment of the unused code impulse detection circuitry of the invention.

FIGS. 1A and 1B Circuitry to Detect Low Level Impulse Noise

The circuitry of FIG. 1A is an alternative embodiment to use the above described mathematical methods to detect low or high level impulse noise by detecting the noise power in unused codes of a frame. The impulse detector of FIG. 1A processes an entire SCDMA frame regardless of how many bursts are transmitted during the frame.

FIG. 1A is a block diagram of circuitry which uses unused or unassigned codes in a CDMA system to detect the presence of either low power or high power impulse or other noise. Line 10 is an optional erasure input line which comes from the prior art time domain impulse noise detection circuitry if such circuitry is used. This line goes active on a per symbol basis if the prior art time domain impulse noise detection circuitry has detected the presence of impulse noise and wants the current symbol entering on line 12 ignored. Normally, all symbols in the same spreading interval will have the same erasure indication. The despread received symbols, i.e., the symbols $Y_1$–$Y_{128}$ in vector 38 of FIG. 10, enter the impulse noise detector on line 12. If a particular symbol is to be ignored per noise detection by the prior art time domain impulse noise detection system, the signal on line 10 will go active when the symbol to be ignored arrives on line 12.

In the preferred embodiment, there will be no preceding time domain impulse noise detection circuitry, and input line 10 will not exist, as is shown in FIG. 1B. In the preferred embodiment, all impulse noise detection is done by the circuit of FIG. 1, but an alternative embodiment comprised of the circuitry of FIG. 1A without the erasure input line 10 and without OR gate 74 also will work.

Figure 11:
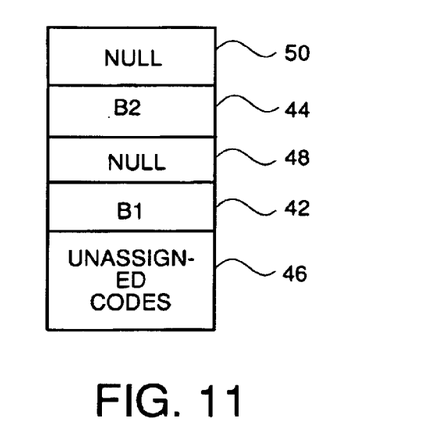
FIG. 11 is an example of a map of assigned codes.

An unused codes index signal enters on line 40. This signal is generated from MAC data received from the CMTS and tells the circuitry which symbols are supposed to have zero values. This signal is generated from a map of the assigned codes which is supplied by the Media Access Control (MAC) process in the CMTS which is responsible for receiving upstream bandwidth requests, making bandwidth awards and sending downstream MAP and UCD messages to the CMs telling them which codes and minislots to use for their upstream bursts. FIG. 11 is an example of a map of assigned codes. Blocks B1 and B2 at 42 and 44 represent the codes assigned to first and second bursts, respectively. The blocks at 46, 48 and 50 represent two different types of unassigned codes. Block 46 represents the unassigned codes for this spreading interval which occur in every DOCSIS frame. In DOCSIS systems, there are usually a few unassigned codes in every spreading interval which are used for calibrating the slicer circuitry in the equalization and predictor circuits in whatever DOCSIS receiver is being used to receive the SCDMA chips. The channel parameters of each channel's UCD message define how many of the total number of codes available for spreading are to be used in the channel. Any unused codes will always be at the beginning starting at code 0. So if only 126 of the 128 possible spreading codes are to be used on an upstream SCDMA channel, then codes 0 and 1 will be unused in that channel. In older, more noisy cable systems, the number of unused codes is controlled by the CMTS to ensure that the power per assigned code is adequate to achieve adequate signal to noise ratio for proper reception. Furthermore, there are frequently null SIDs used to separate different logical subchannels with overlapping bandwidth transmitted at different times on the same channel. These null SIDs can also be used in the invention for impulse noise detection.

The codes represented by blocks 48 and 50 correspond to null SIDs. Null SIDs are unallocated burst which are used in upstream multimode transmissions where two different burst types having different modulation types and/or different symbol rates are transmitted on the same channel in different logical channels or subchannels which have overlapping bandwidth. The null SIDs establish a guardband between these logical channels to prevent overlap and interference between them. Either the unassigned codes or the null SID codes can be used to practice the invention, but reliability is increased when all unused codes are examined to determine the presence of noise. This is because the amplitude of the impulse noise vanes and the amount of energy in any one unused code can vary as compared to the energy in other unused codes. It is therefore more reliable to look for energy in all the unused codes to determine the presence of impulse noise.

Searching for impulse noise power is done, in the embodiments of FIGS. 1A and 1B, by summing the noise power levels or amplitudes of signals in all the unused codes of each spreading interval (up to a maximum of 32 unused codes in the preferred embodiment). Impulse noise is then detected by comparing the noise power to a threshold taken from a lookup table that has a different threshold for each number of unused codes. This avoids the need of division to calculate an average. However, in alternative embodiments, the energy in all the unused codes, or alternatively, just up to 32 of the unused codes, can be averaged, i.e., summed and divided by the number of unused codes in the sum, followed by comparing the average to a programmable threshold level taken from a lookup table that has a different threshold for each number of unused codes. The threshold level to which the noise power average is compared is used to discriminate between sporadic impulse noise and constant background noise. In an ideal world, this threshold would be zero because there would be no background noise. However, the discrimination threshold is not zero in the real world because of the constant presence of background noise.

The background noise is calculated in the preferred embodiment by calculating a moving average over each spreading interval and over all the spreading intervals of the frame using all of the unused codes or at least up to thirty-two of the unused codes. In alternative embodiments however, impulse noise detection can be implemented by looking for energy in any one of the unused codes. This is less reliable.

The circuitry of FIG. 1 performs any of these processes described above to determine the presence of impulse noise in a spreading interval by computing the noise power average in one or more of the unused codes and comparing that noise power average to a discrimination threshold set by the level of background noise.

Figure 15:
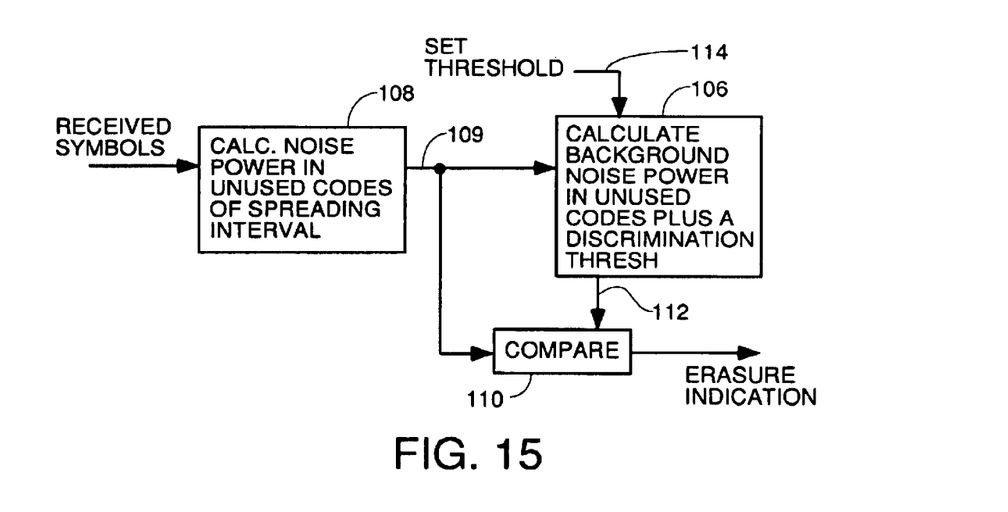
FIG. 15 is a block diagram of a circuit according to the genus of the invention.

Basically, only three steps need to be performed to practice the method genus of the invention. An apparatus according to the genus of the invention is shown in block diagram form in FIG. 15. First, the background noise power level in the unused codes over enough spreading intervals to be sure it is the true background noise power level needs to be calculated. This is done by the circuit 106 in FIG. 15. This background noise power calculation can be done by averaging the noise power levels in the unused codes of a large number of spreading intervals or calculating a moving average thereof, or just making a table or list of the noise power levels over a large sample of unused codes from multiple spreading intervals or multiple frames, and surveying the values and picking a background noise power value which is typical of most of the background noise power levels listed for the unused codes. Block 106 represents circuitry that does any one of these processes. Typically, the background noise is calculated as an average over the spreading intervals of at least one frame and typically multiple frames. The preferred species within this genus calculates the background noise level in the unused codes as a moving average over as many frames as have been processed since initialization.

Second, the noise power level in each spreading interval is determined. This step is performed by block 108 in FIG. 15, and involves receiving the possibly noise corrupted despread symbols of a spreading interval and determining the noise power level in the unused codes. Typically this is done by averaging the noise power in the received symbols that had zero amplitude or value when transmitted. In quadrature amplitude modulated systems or any system where amplitude and phase are used to define each symbol, the power of a symbol is $I^2+Q^2$ where I and Q are the cartesian coordinates of the received symbol in the constellation. In other embodiments, the noise power in each symbol that is supposed to be zero (an "unused code") is listed in a table, and the noise power for the spreading interval is determined by picking a characteristic value. This is not the most accurate method since the impulse noise may last less than the entire spreading interval, but since the impulse noise is spread out into all the received symbols in the despreading process, this embodiment also works. Block 108 represents circuitry to perform any one of these methods, and outputs the noise power per spreading interval on line 109.

Step 2 is where the rubber meets the road since if the noise power in the "unused codes" of a spreading interval is higher by some threshold amount than the background noise, then impulse noise has corrupted the symbols transmitted during that spreading interval. Because the standard against which the noise power in the unused codes of a spreading interval is measured is the background noise in the unused codes over many spreading intervals, much finer discriminations are possible than were possible in the prior art time domain impulse noise detectors. This is possible because there is no actual payload signal in the unused codes which has to be respected during the discrimination process, so any power that is present is noise power.

Third, the noise power level in each spreading interval is compared to the background noise level as determined from the unused codes in a plurality of spreading intervals and, preferably, a plurality of frames, and a determination is made from this comparison whether impulse noise has corrupted the symbols received during said spreading interval. This step is performed by the comparison circuitry 110 in FIG. 15. In the preferred class of species, the background noise power plus some discrimination threshold is used as the standard against which the noise power in a spreading interval is measured. This background noise power plus some discrimination threshold is output by circuit 106 on line 112. Preferably, the discrimination threshold is programmable, as symbolized by the input data on line 114, and is set high enough that erasure indications will not be generated if the noise corrupted symbols still have a signal-to-noise ratio which is high enough that they can be successfully received.

The circuitry of FIG. 1 implements the preferred species within the above defined genus which calculates a moving average of the background noise in the unused codes over a plurality of frames up to and including the frame processed just before the frame of the current spreading interval. The method implemented in the circuit of FIG. 1 also uses two different thresholds, both of which must be satisfied. Finally, the circuit of FIG. 1 will output an erasure indication if either a prior art time domain impulse noise detector indicates an erasure is needed or if the circuit of FIG. 1 determines that an erasure is needed.

The first order of business of the apparatus of FIG. 1 is to calculate the background noise power in the unused codes over all but the current frames to establish a reference noise power level against which the noise power in a spreading interval's unused codes may be compared. The first step in that process is performed by circuit 52 which functions to calculate the average noise level in all or at least some of the unused codes in the current spreading interval being processed. In embodiments where a time domain high power impulse noise detector precedes the circuit of FIG. 1 and input line 10 exists, circuit 52 only calculates the average noise power in the unused codes of spreading intervals the symbols of which are not marked with erasure indications by the time domain impulse detector (not shown). Normally, all the symbols in a spreading interval in which the prior art time domain high power impulse noise detector detected impulse noise will be marked with an erasure indication in the form of a set (logic 1) erasure bit.

Block 54 is used to compute a moving average of the noise power in the unused codes over each frame to establish the background noise floor. In an ideal world, there would be zero energy in the unused codes. However, no system is ideal and there is always some background noise power in the unused codes even in the absence of impulse noise. Impulse noise must be measured against this noise floor so that background noise is not mistaken as impulse noise. Block 54 calculates a moving average of the noise power level in all the spreading intervals over the frame and updates this moving average once every spreading interval using the average noise power of each spreading interval output by circuit 52 on line 56. The formula used to compute the moving average has the same format as FIG. 12. At the end of the frame, the moving average is output. The initial value for the moving average of the noise power in the spreading intervals over the frame is set when the average for the first spreading interval is output on line 56. Thereafter, the frame noise power moving average is updated once every spreading interval for each of the thirty-two spreading intervals in the frame.

Figure 12:
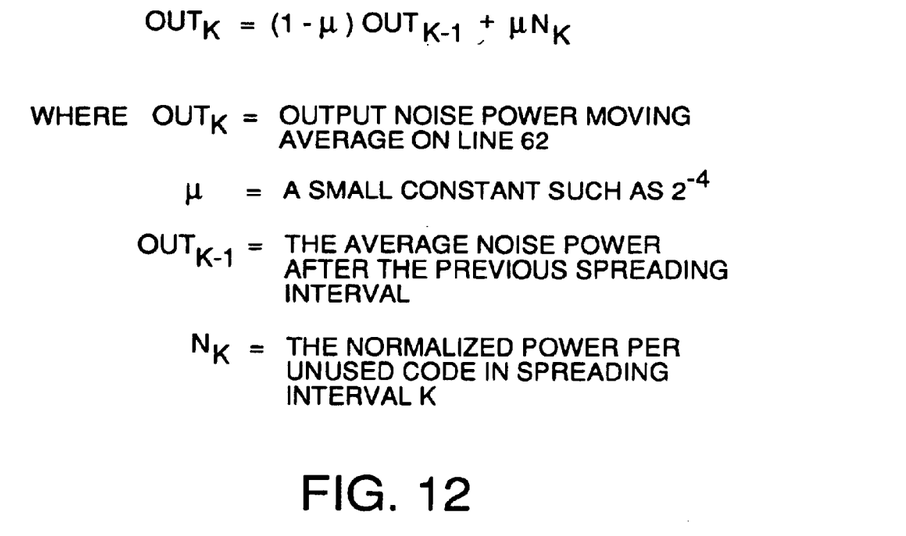
FIG. 12 is the mathematical expression for the moving average calculation.

Block 60 calculates a global noise moving average in the unused codes over all the frames processed since initialization and outputs this moving average on line 64. This moving average is updated once each frame when circuit 54 outputs on line 64 a noise power moving average for the frame just processed. The moving average output on line 64 represents the signal-to-noise ratio of the system. The initial value set into a global noise register (NGBL) which stores the moving average on line 64 is set to a maximum to avoid incorrect decisions regarding the presence of impulse noise at the beginning. The moving average of the noise power per frame is calculated in block 60 in accordance with the formula of FIG. 12. The factor $Out_{k-1}$ in the formula of FIG. 12 is generated by circuit 66. This circuit imposes a one frame delay on the moving average on line 64 and applies the delayed moving average to the inputs of circuit 60 and the erasure decision logic 58 via line 68. Each frame, the value of the global noise register is updated with the new moving average of the frame just processed, this moving average being the moving averages of the background noise in the unused codes in the spreading intervals within that frame. In this manner, the moving average of background noise does not have to be recomputed each frame.

A moving average is a good estimation of the background noise even though impulse noise will occasionally occur and raise the moving average. Because impulse noise tends to be temporary in nature, it does not raise the moving average so much as to distort the estimate of background noise so much as to make the system unreliable. By using a moving average, even if the noise floor is rising, the average will also rise so that impulse noise can be distinguished over the noise.

The average noise power per spreading interval on line 56 is also supplied to erasure decision logic 58.

The actual decision regarding whether impulse noise is present or not is made by erasure decision logic 58. It receives a control signal on line 70 which controls whether impulse detection is turned on or off. Circuit 58 receives the average or normalized noise power in the unused codes of the current spreading interval being processed on line 56. Circuit 58 also receives the global background noise moving average from the previous frame processed on line 68 from delay circuit 66. If the average noise power in the current spreading interval's unused codes on line 56 is higher by some delta value (programmable in the preferred embodiment, fixed in alternative embodiments) than the background noise power represented by the signal on line 68 (line 62 in the embodiment of FIG. 1B), then erasure decision logic outputs an erasure indication on line 76. The erasure indication on line 76 is output on a per symbol basis and serves as the erasure bit of that symbol. In the embodiment shown, an OR gate 74 receives the signal on line 72 at one input and the erasure indication on a per symbol basis from the prior art high power impulse noise detector on line 10, and, if either or both signals indicates impulse noise is present, an output erasure indication on line 76 is generated. In alternative embodiments, the prior art time domain high power impulse noise detector is not used so OR gate 74 and input 10 are not present and line 72 serves as the impulse noise erasure indication.

Figure 13:
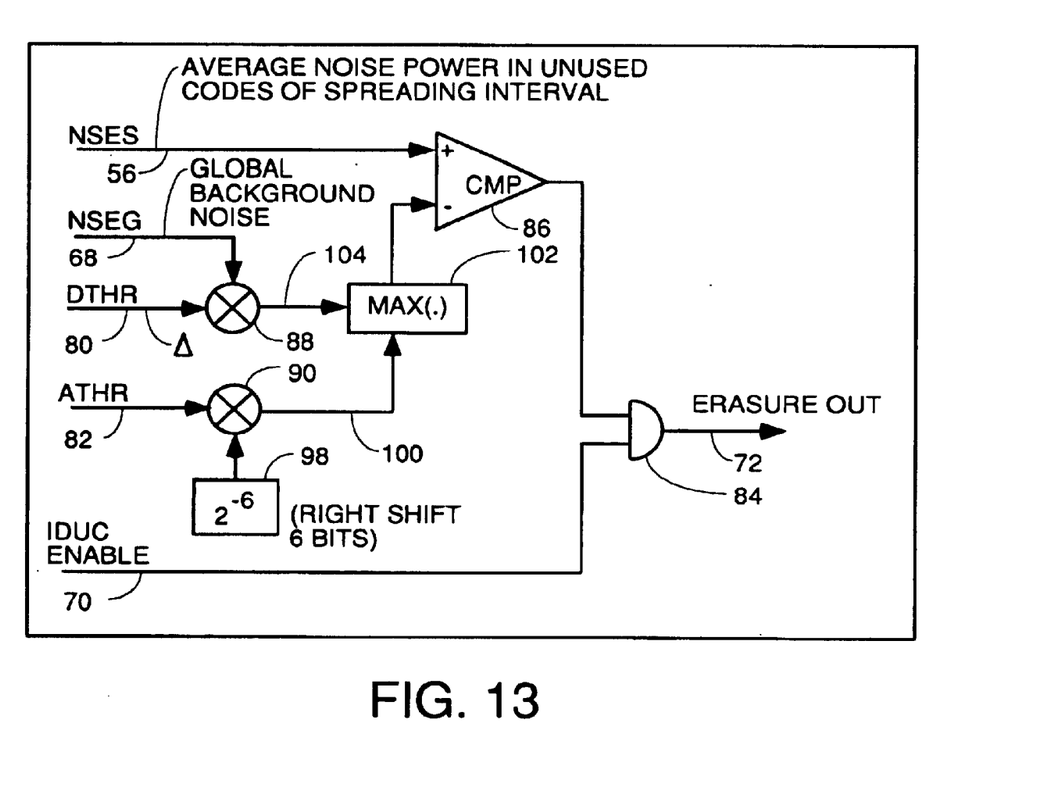
FIG. 13 is a more detailed block diagram of the circuitry of the preferred erasure decision logic.

FIG. 13 is a more detailed diagram of the circuitry in erasure decision logic 58. The signal NSEG on line 68 comes from a register in delay circuit 66 in FIG. 1 and represents the moving average of background noise in unused codes for all frames processed through the frame just prior to the frame of the current spreading interval. The NSES signal on line 56 is the average noise power in the unused codes of the spreading interval currently being processed. In the discussion below the background noise power and the average noise power in the spreading intervals and two discrimination thresholds are sometimes expressed in terms of signal-to-noise ratios (SNR). Since the definition of SNR is $10\log_{10} S_{pwr}/N_{pwr}$ and the signal power $S_{pwr}$ is zero, expressing the background noise power and the thresholds etc. in terms of SNR is not precisely correct. For purposes of discussion, assume that the signal power in the unused codes is some infinitessimally small non zero value so that the convenient term SNR may be used. Keep in mind that the overall purpose of the invention is to measure background noise power and noise power in the received and despread versions of the symbols from the information vector that were spread and which have signal powers of zero. Either signal power or noise power or the combination of the two in a received QAM symbol is defined by $I^2+Q^2$ where I and Q are the vector orthogonal components of the constellation point. The invention could just as easily be expressed in terms of the average noise power in the unused codes over multiple frames versus the impulse noise power of a particular spreading interval as compared to a discrimination threshold, all expressed in dBm or dBmv which are traditional measures of power.

In FIG. 13, the DTHR signal on line 80 and the ATHR signal on line 82 come from programmable registers (not shown). The DTHR signal defines how small the difference or delta must be between the moving average of the background noise power in the unused codes and the average noise power in the unused codes of the spreading interval currently being processed before an erasure indication will be triggered. In other words, the DTHR signal determines how low the spreading interval signal to noise ratio can go (lower SNR means more noise is present) before triggering the erasure indication output signal. The ATHR signal on line 82 is an absolute threshold. It sets the level of noise power or the lowest possible SNR which, if exceeded by the average noise power in a spreading interval will definitely cause an erasure indication to be generated by the comparator 86. In other words, if the absolute average noise power in the unused spreading codes in the spreading interval being processed is above this ATHR level, then an erasure indication will be generated because that level of noise power will interfere with proper reception whereas there are lower levels of noise power that exceed the DTHR threshold but which can still be received properly. The ATHR signal is used to ensure that the decision logic will not declare an erasure when the background signal to noise ratio is extremely high meaning the channel is quiet enough that there is no need for an erasure indication.

Circuits 88 and 90 are multipliers. Multiplier 88 multiplies the global background noise by a delta value to raise it to some threshold level which will trigger the erasure indication if the noise power in the current spreading interval exceeds it.

In a theoretical world, DTHR and the multiplier 88 are all that is needed to make the circuit work. However, in the real world, the delta established by DTHR is not enough to effectively discriminate against impulse noise since it may result in erasures when the impulse noise is present, but the signal to noise ratio of the received symbols is perfectly within the capabilities of the receiver to slice the received symbols and error detect and correct the resulting recovered data. For example, suppose the background noise NSEG on line 78 is 37 dB (SNR), and the SNR of the current spreading interval (NSES) is 32 dB. In this case, if the discrimination threshold DTHR is set at 4 dB, an unnecessary erasure indication would be output. This erasure indication is unnecessary because a 32 dB SNR is well within the capabilities of the receiver to correctly recover the payload data encoded in the received symbols. To prevent this, the ATHR threshold is used. In this example, the ATHR threshold is set at an SNR of 30 dB, and no erasure indication triggered. The ATHR signal can also serve as manual detection threshold overwriting DTHR in the case where the channel SNR is known by the cable operator.

Figure 14:
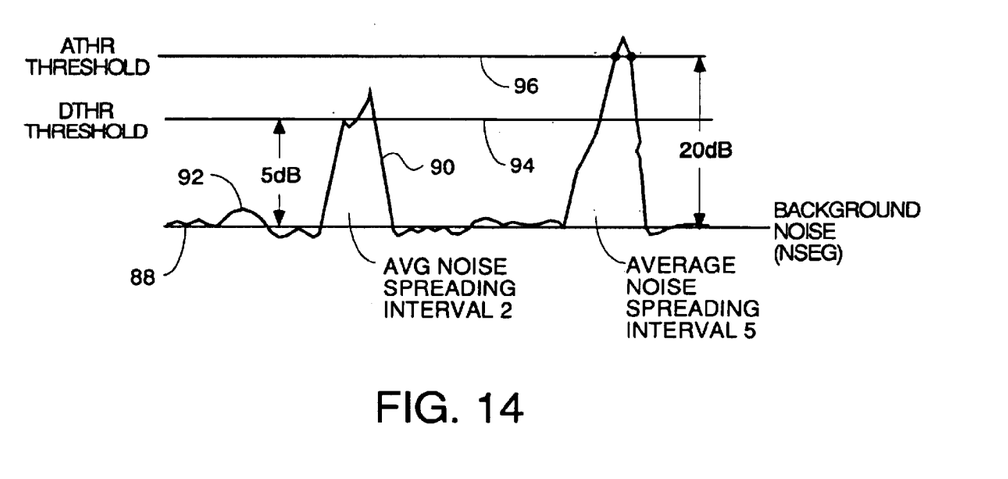
FIG. 14 is a diagram explaining the use of two discrimination thresholds.

FIG. 14 is a diagram that explains the relationship between DTHR and ATHR more clearly. Line 88 represents the moving average of the background noise. Peak 90 represents the average noise power in the form of the SNR of the signal in the unused codes of spreading interval 2. The SNR of the signal in spreading interval 1 is down around the background noise level and is represented by peak 92 which is basically on top of background noise line 88. Line 94 represents the DTHR SNR level which is programmed at 5 dB above the background noise SNR level. Assuming the background noise level is 37 dB, the SNR in spreading interval 2 is approximately 31 dB and exceeds the DTHR threshold, but this level of noise is easily within the capabilities of the receiver to correctly receive it. Thus, it is not necessary to trigger an erasure indication. The ATHR threshold is used to prevent this. It is set at a much higher level of impulse noise power which would impair correct reception of the transmitted data. In this example, the ATHR threshold is represented by line 96 and is set 20 dB "lower" (more noise present) than the background noise level 88. Only the average noise power or SNR in the unused codes of spreading interval 5 exceeds the ATHR threshold and will trigger an erasure indication.

The right shift circuit 98 and multiplier 90 are both ASIC specific implementations made necessary because the number of bits on line 100 are fewer than the number of bits on line 82. In other embodiments, both the multiplier 90 and the right shift constant circuit 98 can be eliminated, and the ATHR signal line 82 is coupled directly to the circuit 102. The circuit 102 functions to compare the two thresholds on line 100 and 104 and apply the biggest noise power threshold (the lowest SNR value) to an input of the comparator 86 for comparison against the average noise power in the unused spreading codes of the spreading interval being processed, NSES on line 56. This insures that no erasure indication will be generated for a symbol unless both the DTHR and ATHR noise power thresholds have been exceeded.

The IDUC enable signal on line 70 is input to an AND gate 84 which outputs the erasure indication signal on line 72. If IDUC enable is 0, then the AND gate forces the erasure indication signal on line 72 to be zero at all times even if impulse noise is present.

The erasure indication signal on line 76 is coupled to trellis code demodulator, equalization filtering and clock recovery circuits to prevent them from relying on corrupted symbols in doing their work or in setting equalization circuitry slicer calibration to discriminate between different signal levels and phases, and enabling better error correction and detection.

Although the invention has been disclosed in terms of the preferred and alternative embodiments disclosed herein, those skilled in the art will appreciate possible alternative embodiments and other modifications to the teachings disclosed herein which do not depart from the spirit and scope of the invention. All such alternative embodiments and other modifications are intended to be included within the scope of the claims appended hereto.

What is claimed is:

1. A method of detecting low power impulse noise in a synchronous code division multiple access spread spectrum digital data transmission used for transmitting data between a plurality of cable modems and a cable modem termination system, comprising the steps:

a) determining the background noise power by determining the noise power received on null service identifiers (SIDs) codes and/or unassigned codes over a plurality of spreading intervals of synchronous code division multiple access transmission;

b) receiving the symbols transmitted using assigned spreading codes during a spreading interval of a synchronous code division multiple access frame, and determining the noise power level during said spreading interval in by determining noise power received on null SID codes and/or in null symbols of a received symbols vector which correspond to symbols of an information vector which would have had their spectrum spread in a cable modem by unassigned codes during said spreading interval had the values of said null symbols in said information vector not been set to zero, said received symbols vector resulting from matrix multiplication of a received result vector times the transpose of a code matrix which was used in said cable modems to spread the spectrum of symbols in said information vector to be transmitted to said cable modem termination system during said spreading interval; and c) comparing the noise power level in said null symbols and/or received on null SID codes of said spreading interval as determined in step b to said background noise power in the unused codes of a plurality of spreading intervals, as determined in step a, plus a predetermined discrimination threshold, and determining from said comparison if symbols received during said spreading interval have been corrupted by impulse noise to an extent such that the symbols cannot be received properly, generating an erasure indication for each such noise corrupted symbol received during said spreading interval.

2. The method of claim 1 wherein step a is performed by calculating a moving average of the background noise power in the unassigned codes and/or null SID codes of all the frames processed except a current frame containing a spreading interval currently being processed.

3. The method of claim 1 wherein step a is performed by creating a table or list of all the background noise powers in the unassigned codes and/or null SID codes of a plurality of spreading intervals and picking a typical value for background noise power which is representative of the typical background noise power level observed in most unassigned unused codes and/or null SID codes.

4. The method of claim 1 wherein step b is accomplished by averaging the noise power in the received null symbols which are supposed to be zero.

5. The method of claim 1 wherein step b is accomplished by listing the noise power in the received null symbols which are supposed to be zero, and picking a representative noise power number from one of these null symbols to represent the noise power of the spreading interval.

6. The method of claim 1 wherein step c is accomplished by adding an absolute discrimination threshold to said background noise power level determined in step a and using the resulting value as the comparison standard against which the noise power in the unassigned codes and/or null SID codes of said spreading interval determined in step b is measured.

7. The method of claim 1 wherein step c is accomplished by adding a programmable discrimination threshold value in dB to said background noise power level determined in step a in dB and using the resulting value in dB as the comparison standard against which the noise power in the unused codes of said spreading interval determined in step b is measured.

8. The method of claim 7 wherein said programmable discrimination threshold is set such that erasure indications will not be generated if the noise corrupted symbols still have a signal-to-noise ratio which is high enough that they can be successfully received.

9. The method of claim 7 wherein said discrimination threshold is comprised of a first programmable threshold and a second absolute threshold which is set at a signal-to-noise ratio level which is set sufficiently below said background noise Dower level such that symbols received with a signal-to-noise ratio which is below said second absolute threshold will be corrupted by impulse noise as to require erasure indications because they cannot be received correctly, and wherein step c comprises only generating an erasure indication when the signal-to-noise ratio of a symbol in a spreading interval is lower than both said first programmable and second absolute thresholds.

10. The method of claim 1 wherein step a is performed by performing a moving average of background noise power on unassigned codes and/or null SID codes over a plurality of spreading intervals.

11. The method of claim 1 wherein step a is performed by using slicer errors in detecting payload data symbols transmitted on assigned codes.

12. An apparatus for detecting low power impulse noise in a spread-spectrum digital data transmission system which transmits synchronous code division multiple access spread spectrum symbols in a plurality of frames, each frame comprised of one or more spreading intervals during which a number of symbols which are less or equal to a number of spreading codes in a code book are transmitted via spread spectrum multiple access transmission such that some spreading codes are unassigned in each spreading interval or null service identifiers (SIDs) codes are present to separate different logical channels and upon which no data is transmitted, comprising:

a first means for receiving symbols transmitted during a spreading interval wherein at least some of said symbols of an information vector transmitted during a spreading interval are null symbols which had zero values when they had their spectrums spread by matrix multiplication by a code matrix containing spreading codes of a code book, and determining the noise power during each spreading interval by determining noise power in said null symbols transmitted during said spreading interval and which are supposed to have zero values, and outputting the noise power per spreading interval at an output;

a second means having an input coupled to said output of said first circuit for receiving said noise power per spreading interval data and using said data to determine the average background noise power over a high number of spreading intervals, and for adding a programmable discrimination threshold amount to said average background noise power and outputting a signal representing said average background noise power plus said discrimination threshold at an output;

a comparison circuit coupled to said outputs of said first and second means and having an output at which an erasure indication is generated for each symbol transmitted during said spreading interval when said noise power in said null symbols transmitted using unassigned codes of a spreading interval exceeds said background noise power plus said discrimination threshold.

13. An apparatus for detecting low power impulse noise in a spread spectrum digital data transmission system which transmits spread spectrum symbols in a plurality of frames, each frame comprised of one or more spreading intervals during of which a number of symbols equal to a number of spreading codes in a code book are transmitted via spread spectrum multiple access transmission, comprising:

a first circuit for receiving symbols of a spreading interval, and averaging the noise power in the symbols which are supposed to have zero values, and outputting the average noise power in the unused codes of said spreading interval at an output;

a second circuit coupled to said output of said first circuit for computing a moving average of the average noise power in the unused spreading codes of all the spreading intervals in a frame and outputting said moving average at an output;

a third circuit coupled to said output of said second circuit for calculating a moving average of background noise power in unused codes of the spreading intervals of each frame over a plurality of frames by computing a moving average of said moving averages output by said second circuit, and output said moving average as a background noise power; and erasure decision logic having a first input coupled to said output of said first circuit and having a second input coupled to the output of said third circuit, and having an erasure indication signal output at which an erasure indication signal is set when the signal at said first input exceeds the signal at said second input plus a predetermined threshold.

14. The apparatus of claim 13 further comprising an OR gate having a first input coupled to said erasure indication signal output and having a second input coupled to receive an erasure indication signal from a prior art time domain impulse noise detector.

15. An apparatus for generating erasure indications in a digital data receiver that receives signals transmitted using synchronous code division multiplexing during one or more spreading intervals in every synchronous code division multiple access frame, comprising:

a first circuit for receiving stools transmitted during each spreading interval of each synchronous code division multiple access frame and calculating the average noise power level per synchronous code division multiple access spreading interval for all the unassigned codes and/or null service identifiers (SIDs) codes in a spreading interval being processed, and having an output at which said average noise power level per spreading interval in said unassigned codes and/or null SID codes appears;

a second circuit for receiving said average noise power level per spreading interval signal output by said first circuit and computing a moving average of the noise power level in the unassigned codes and/or null SID codes over all the spreading intervals in each frame which has been processed up until the current frame to establish the background noise power level, and having an output at which said moving average of the background noise power appears; and an erasure decision logic circuit coupled to receive said average noise power level per spreading interval in said unassigned codes and/or null SID codes output by said first circuit and said moving average of said background noise power level from said second circuit, and for comparing these two signals, and if the average noise power level per spreading interval in said unassigned codes and/or null SID codes exceeds said background noise Dower level by a predetermined discrimination threshold amount, for outputting an erasure indication.

* * * * *